US006208651B1

(12) United States Patent
Van Renesse et al.

(10) Patent No.: US 6,208,651 B1
(45) Date of Patent: Mar. 27, 2001

(54) METHOD AND SYSTEM FOR MASKING THE OVERHEAD OF PROTOCOL LAYERING

(75) Inventors: Robbert Van Renesse, Ithaca, NY (US); Mark Hayden, San Jose, CA (US)

(73) Assignee: Cornell Research Foundation, Inc., Ithaca, NY (US)

( * ) Notice: Subject to any disclaimer, the term of this patent is extended or adjusted under 35 U.S.C. 154(b) by 0 days.

(21) Appl. No.: 09/094,204

(22) Filed: Jun. 9, 1998

Related U.S. Application Data (60) Provisional application No. 60/049,146, filed on Jun. 10, 1997.

(51) Int. Cl.[7] ............................... H04J 3/26; H04L 12/56
(52) U.S. Cl. ......................... 370/392; 370/465; 370/469; 370/471
(58) Field of Search ..................... 370/389, 392, 370/395, 401, 465, 466, 469, 470, 471, 474; 709/227, 230, 238, 246, 247

(56) References Cited

U.S. PATENT DOCUMENTS

| 5,214,642 | * | 5/1993 | Kunimoto et al. | 370/82 |
| 5,375,121 | * | 12/1994 | Nishino et al. | 370/94.2 |
| 5,610,918 | * | 3/1997 | Kamo et al. | 370/395 |
| 5,732,071 | * | 3/1998 | Saito et al. | 370/255 |
| 5,822,319 | * | 10/1998 | Nagami et al. | 370/392 |

* cited by examiner

*Primary Examiner*—Alpus H. Hsu
(74) *Attorney, Agent, or Firm*—Hodgson, Russ, Andrews, Woods & Goodyear LLP (57) ABSTRACT

The Protocol Accelerator is a system which significantly reduces the communication latency of complex layered communication protocols. In particular, the protocol accelerator reduces both the message header overhead imposed by layered protocols and the message processing overhead by employing such techniques as classifying, collecting and aligning the headers, using shorter identifiers to represent information in immutable fields of the headers, introducing pre- and post-processing of a message, packet filtering, and packing and unpacking of messages in cases where a backlog of messages has to be processed by the protocol accelerator.

21 Claims, 5 Drawing Sheets

```
send(con, msg) {            /* called by application */
        if (con->send.disable > 0)
                { add_to_backlog(con->backlog, msg); return; }
        push_packing_info(msg);
        push_predict_header(con->predict, msg);
        if (run_packet_filter(con->send.filter, msg)) {
                push_cookie(con->cookie, msg);
                to_network(con, msg);
                to_protocol_stack(con, POSTSEND, msg);
        }
        else to_protocol_stack(con, PRESEND, msg);
} from_network(msg) {     /* called by network driver */
        pop_preamble(msg, &preamble);
        if (conn_ident_present(preamble)) {
                pop_conn_ident(msg, &conn_ident);
                    if (!get_conn_by_ident(conn_ident, &con)) return;
                con->cookie = preamble.cookie;
                con->conn_ ident = conn_ident;
        }
        else if (!get_conn_by_cookie(preamble.cookie, &con)) return;
        if (!run_packet_filter(con->recv.filter, msg)) return;
        if (con->recv.disable == 0 &&
            msg->predict.prot_spec == con->predict.prot_spec) {
              deliver(con, msg);
              to_protocol_stack(con, POSTDELIVER, msg);
        }
        else to_protocol_stack(con, PREDELIVER, msg);
} deliver(con, msg) {       /* called by from_network() and PREDELIVER */
        pop_packing_info(msg, &pack_info);
        if (is_packed(pack_info)) {
                msg_list = unpack(pack_info, msg);
                for_each msg in msg_list { to_application(msg); }
        }
        else to_application(msg);
}
```

METHOD AND SYSTEM FOR MASKING THE OVERHEAD OF PROTOCOL LAYERING

CROSS-REFERENCE TO A RELATED APPLICATION

This application claims priority on earlier filed provisional patent application Serial No. 60/049,146, filed Jun. 10, 1997, which is incorporated herein by reference.

BACKGROUND OF THE INVENTION

The present invention relates to transmitting data over digital networks, and, in particular, to improving message latency and increasing throughput by reducing overhead caused by interfaces and headers in different protocol layers.

It is known that often increasing capacity of a non-congested network has no or very little effect on increasing the throughput. That happens due to the fact that delays occur in the software on hosts, not in the transmission lines themselves. Peer entities of two hosts (for example, two transport layers) communicate with each other by using protocols.

Distributed systems employ communication protocols for reliable file transfer, window clients and servers, RPC atomic transactions, multi-media communication, etc. Layering of protocols has been known as a way of dealing with the complexity of computer communication. The convenience of having a stack of protocols is often overshadowed by the problem that layering produces a lot of overhead which, in turn, increases delays in communication and leads to performance inefficiencies. One source of overhead is interfacing. Crossing a protocol layer costs some CPU cycles. The other source is header overhead. Each layer uses its own header, which is prepended to every message and usually padded so that each header is aligned on a 4 or 8 byte boundary. The size of each layer's header, together with a trend to very large host addresses (of which at least two addresses per message are needed), makes it impossible to have a smaller header. Evidently, it is of great importance to develop techniques that reduce delays by improving performance of layered protocols.

Various techniques improving performance of a communication system with layered communication protocols have been offered in the past. One of the successful techniques is reduction of communication latency. Particularly, the technique calls for minimization of the processing time from the moment when a sender hands a packet down to a protocol stack to the moment when the lowest protocol layer sends the packet out to a communication channel. For example, U.S. Pat. No. 4,914,653 "Inter-processor communication protocol" to Bishop et al. discloses a method according to which each host assigns a certain priority to a message it intends to transmit. Regular-type messages are assigned a lower priority, acknowledgment-type messages are deemed to be "quick" messages with a higher priority. According to that protocol, a receiving host returns a high priority message to a sending host either during or following the transmission of every regular packet. That allows the receiving host to return acknowledgments to the sending host without having to piggyback them to another outgoing communication or without having to save and batch the acknowledgments for later transmission. Similarly, at the receiving host top priority acknowledgments are received and temporarily stored separately from regular messages. Such acknowledgments are processed independently of the arrival of regular messages. The invention disclosed in the Bishop patent optimizes the performance of protocols by only prioritizing incoming and outgoing communication handled by the protocols.

U.S. Pat. No. 5,487,152 "Method and apparatus for frame header splitting in a media access control/host system interface unit" to Young describes an interface between a media access control (MAC) function of a local area network and a host attached to the network medium via the MAC. The interface is capable of determining points within a frame where a frame can be split for further processing. The frame splitting feature allows the header of a frame to separate from the data part of the frame and place the data and the header into separate buffers. Later, headers can be processed from their buffer even when the data buffer space is full.

An Ethernet network hub adaptor that is modified to provide a known bounded low maximum access latency is disclosed in U.S. Pat. No. 5,568,469 "Method and apparatus for controlling latency and jitter in a local area network which uses a CSMA/CD protocol" to Sherer et al. The adaptor regulates access of different stations to the channel by having a special state variable stored in the MACs. Latency is reduced by ensuring that the hub and hosts take turns in transmitting packets. The method described in that patent does not address the possibility of optimizing packets themselves or optimizing the manner in which packets travel through a protocol stack.

Similarly, U.S. Pat. Nos. 5,412,782 and 5,485,584 disclose the reduction of overall latency in an Ethernet network by providing a controller in an Ethernet adapter, the controller generating interrupts for receiving or transmitting different portions of a packet. Again, those patents employ an external device, a controller, for reducing latency communication.

From the overview of the prior art it becomes clear that none of the existing patents takes into account the design features of already existing protocols to achieve improvement in end-to-end massage latency. Such an approach is very desirable, since modern network technology itself allows for very low latency communication. For example, the U-Net interface to an ATM network allows for 75 $\mu$second round-trip communication as long as the message is 40 bytes or smaller. That system is described in a publication by Anindya Basu, Vineet Buch, Werner Vogels, and Thorsten von Eicken: U-Net: A user-level network interface for parallel and distributed computing. In *Proc. of the Fifteenth ACM Symp. on Operating Systems Principles*, pages 40–53, Copper Mountain Resort, Colo., December. 1995, that is incorporated herein by reference. For larger messages, the latency is at least twice as long. It is therefore important that protocols that are unimplemented over U-Net use small headers and do not introduce much processing overhead.

So far, complex communication protocols and, in particular, layered ones, have introduced orders of magnitude of overhead compared to the latencies of the underlying networks. As networks are getting faster and faster (by the introduction, for example, of fast optical networks), the effect of overhead on the network latency has been worsening.

SUMMARY OF THE INVENTION

It is, therefore, the object of the present invention to reduce overhead by developing a Protocol Accelerator (PA), comprising a collection of techniques implementation of which significantly reduces both the message header overhead imposed by layered protocols and the message processing overhead of complex communication protocols. In particular, when a Protocol Accelerator applies to complex layered protocols that are employed in conjunction with high-speed networks, the latency of the layered protocol stack becomes approximately the latency of the underlying network. The Protocol Accelerator can be used to create distributed computer systems that are faster and more robust than existing systems.

The method and system of the PA comprise the following inventive steps:

1. The fields in the message headers are classified in four categories.
2. The fields are collected together in four headers, one for each category. Each of the four headers is carefully packed, minimizing padding necessary for alignment and reducing header overhead.
3. One of the categories comprises fields that are immutable over the time when a connection is active. Rather than including the immutable information in every message, such information is only sent once. Subsequent messages use only a short identifier to represent immutable information. The short identifier is called a "connection cookie". Therefore, the use of a "connection cookie" reduces the header overhead and connection lookup time upon receipt of a message by a receiving host.
4. The communication protocol is transformed into a canonical form. The canonical form of a communication protocol is defined as a two-phase message processing: the pre-processing and the post-processing. The pre-processing phase concerns itself with a message header and does not update the protocol state. The post-processing phase updates the protocol state.
5. Since pre-processing does not change the protocol state, a certain category of message header fields can be "predicted". That is, certain fields can be calculated before sending the message or before receiving a message. Because these certain fields are calculated outside the "critical path" of the actual send and receive operations, they do not impose overhead on the send and receive operations, thereby minimizing latency. "Critical path" is defined as the most commonly used path through the executable code of the protocol stack. In most cases a message passing through the code will follow the same path, which is called "critical path" in accordance with the present invention.
6. The Protocol Accelerator employs a packet filter. In contrast with conventional packet filters that can only read headers, the present invention extended the packet filter to include an operation that updates headers.
7. In the Protocol Accelerator two packet filters are used: one for receiving and one for sending messages. Typically, a packet filter is used to route received messages to the correct destination process. According to the present invention the packet filter checks unpredictable fields of the header for correctness when a packet is received. "Checking for correctness" means making sure that the header in consistent with the protocol state and the contents of a message. When a packet is sent, certain uncommon cases can be detected that could not be predicted. Using a combination of header prediction and packet filters, the preprocessing of the communication protocol is avoided altogether.
8. Finally, the Protocol Accelerator deals with a backlog of messages by packing the backlog into a single message. This way, protocol processing for backlogged messages is done only once.

In brief, the PA eliminates message header overhead and message processing overhead almost entirely by using three main techniques. First, the information corresponding to the header fields that never change is sent only once. Second, the rest of the header information is carefully packed, ignoring layer boundaries, which leads to headers that are much less than 40 bytes. Third, a semi-automatic transformation is done on the send and delivery operations, splitting them into two parts: one part that updates or checks the header but not the protocol state, and the second part vice versa. The first part is then executed by a special packet filter (in both send and delivery paths) to circumvent the actual protocol layers whenever possible. The second part is executed when the application is idle or blocked.

Therefore, the PA allows for the use of complex protocols that were too expensive to apply in the past. Complex protocols are desirable to use in order to build more robust protocols and to allow use of high-level programming languages that add significantly to robustness. The Protocol Accelerator of the present invention masks significant overhead introduced by using a high-level language, as long as the Protocol Accelerator itself is implemented in an efficient language like C or assembly. Finally, by employing a more complex communication protocols, the application built on them can be kept simpler, leading to increased robustness and efficiency of a communication system.

These and other aspects of the method and system implementing the Protocol Accelerator will become increasingly more apparent to those of ordinary skill in the art by reference to the following detailed description taken in conjunction with the accompanying drawings.

DETAILED DESCRIPTION OF THE PREFERRED EMBODIMENT

1. Reducing Header Overhead

In traditional layered protocol systems, each protocol layer designs its own header layout. The headers are concatenated and prepended to each user message. For convenience, each header is aligned to a 4 or 8 byte boundary to allow easy access to the header. In systems like the x-kernel or Horus, where many simple protocols may be stacked on top of each other, such alignment leads to extensive padding overhead. The Horus system is disclosed in an article by Robbert Van Renesse, Kenneth P. Birman, Roy Friedman, Mark Hayden, and David A. Karr, A Framework for Protocol Composition in Horus, in *Proc. of the Fourteenth ACM Symp. on Principles of Distributed Computing*, pages 80–89, Ottawa, Ontario, August 1995, ACM SIGOPS-SIGACT, which is incorporated herein by reference.

Also, some fields in the headers, such as the source and destination addresses, never change from message to message. Instead of agreeing on these values, they are included in every message and used as the identifier of a connection to the peer entity. Since addresses tend to be large and are getting significantly larger because of the rapid growth of today's Internet, repeating large addresses in each header is ineffective.

The Protocol Accelerator of the present invention reduces the header overhead significantly by eliminating padding and agreeing on immutable fields in headers. For clarity, it is noted that in accordance with the present invention a PA is employed per connection rather than per host or per process.

1.1 Header Information Classes

Figure 1:
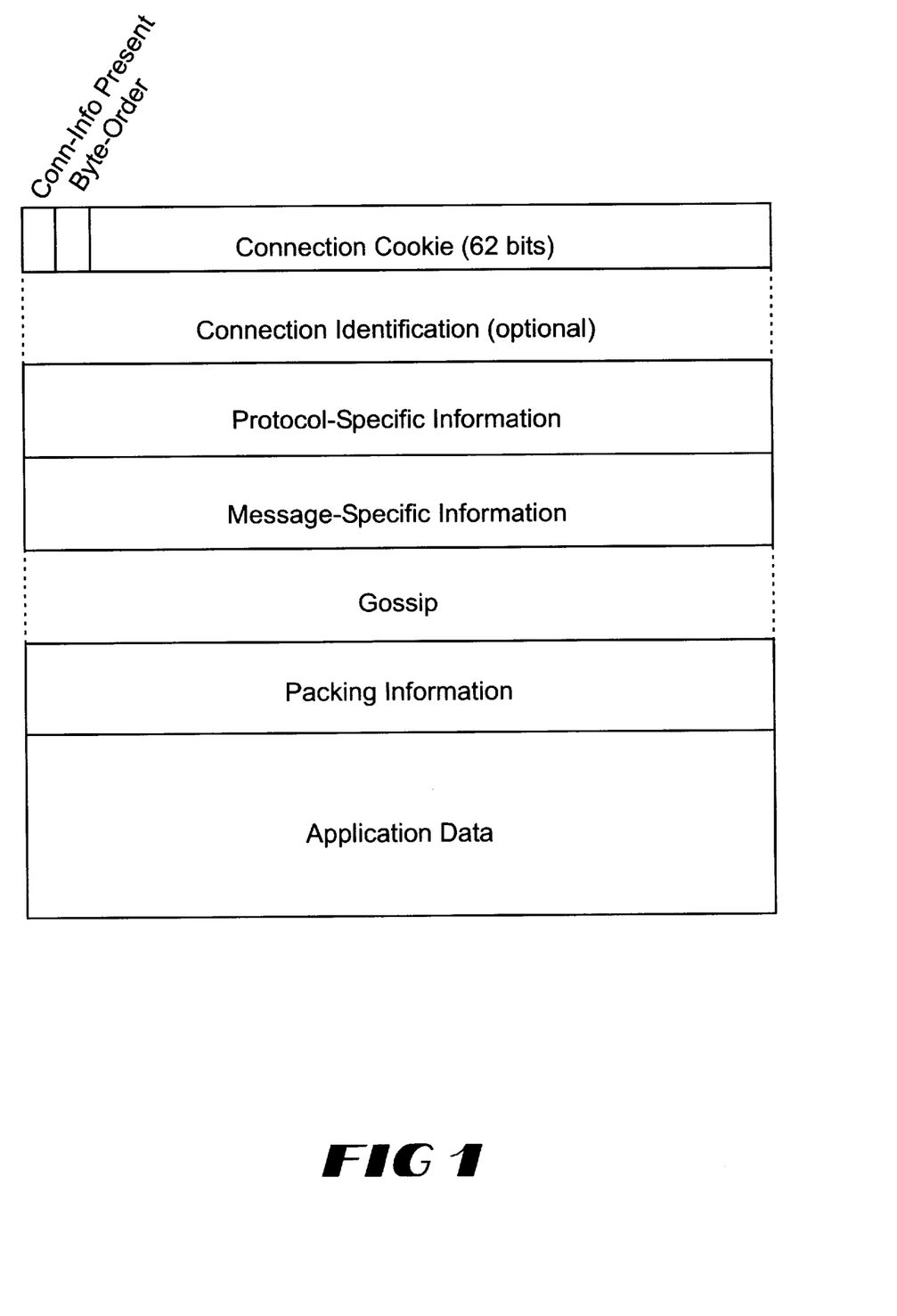
FIG. 1 is a diagrammatic view illustrating the format of a Protocol Accelerator message according to the present invention.

To enable the optimizations, the PA divides the fields in the protocol headers into four classes, as illustrated in FIG. 1:

1. Connection Identification—fields typically used for identifying connections. Such fields never change during the period of a connection. Examples of such fields are the source and destination addresses and ports of the communicating peers, as well as byte-ordering information of their architectures.
2. Protocol-specific Information—fields that are important for the correct delivery of a particular message frame. According to the present invention, protocol-specific information depends only on the protocol state, and not on the contents, length or type of a message (e.g., data, acknowledgments, or negative acknowledgments).
3. Message-specific Information—other fields that need to accompany a message, such as message length and checksum, or a timestamp. Typically, but not necessarily, such information does not depend on the protocol state, but on the message itself.
4. Gossip—fields that technically do not need to accompany a message, but are included for message efficiency. For example, piggybacked acknowledgements fall into this category. Like protocol-specific information, these fields do not depend on the message content. Often these fields do depend on the protocol state, but they can be out-of-date without affecting the protocol correctness.

Each protocol layer requests a set of fields to be included in the header using calls to handle=add_field(class, name, size, offset);

Here class specifies the header information class, name is the name of the field (which does not need to be unique), and size specifies the size of the field in bits. Offset specifies the bit offset of the field in the header if it is important. Offset is usually set to −1 to indicate don't care. The function returns a handle for later access.

After the initialization function of all layers have been called, the PA collects all the fields and creates four headers, one for each class. When the PA makes a header, fields are fit together without changing the size of each field, and if so requested, without changing offset, but not layering. Since the PA itself fits the fields of a header together, layering of protocols has no effect on a header. Therefore, fields requested by different layers may be mixed up arbitrarily, minimizing padding while optimizing alignment. In the original Horus system, for example, each layer's header was aligned to 4 bytes, resulting in a total padding of at least 12 bytes-for a fairly small protocol stack-and going up quickly for each additional layer.

The PA provides a set of functions to read or write a field. The functions take byte-ordering into account, so that layers do not have to worry about communicating between heterogeneous machines. Also, the PA makes the entire system directly portable to 64-bit architectures.

1.2 Connection Cookies

The PA includes Protocol-specific and Message-specific information in every message. Currently, although not technically necessary, Gossip information is always included, since usually it is small. To the contrary, Connection Identification fields that never change are only included occasionally, because they tend to be large. In the PA of the present invention the header compression technique is generalized for arbitrary protocols.

A PA message starts out with an 8-byte header, called a Preamble, as illustrated in FIG. 1. The Preamble contains the following three fields:

1. Connection Identification Present Bit—a single bit that is set if and only if the Connection Identification fields are included. If the Connection Identification Present bit is set, the Preamble is immediately followed by the Connection Identification header, the remaining headers, and the user message itself, in that order. If the Connection Identification Present bit is cleared, the Connection Identification is left out.
2. Byte Ordering Bit—a single bit that is set if the ordering of the bytes in a message is little endian, and clear if the ordering is big endian. Other types of ordering are not supported.
3. Connection Cookie—a 62-bit number. It is chosen at random and identifies a particular connection.

The PA includes the Connection Identification in the first message. In addition, it is included in retransmissions and other non-regular messages. The receiver remembers what the current (incoming) cookie for each connection is. When a message with an unknown cookie is received, and the Connection Identification Present Bit is cleared, such a message is dropped. If the bit is set, the Connection Identification is used to find the connection.

Since the Connection Identification tends to include very large identifiers, the above-described mechanism significantly reduces the amount of header space. For example, in Horus the Connection Identification typically occupies about 76 bytes. Cookies also reduce connection lookup time required for message deliveries. A variation of the technique utilizing cookies instead of connection identifications in every message was discussed in Jonathan S. Kay. PathIDs: *A Mechanism for Reducing Network Software Latency*. PhD thesis, Univ. of California, San Diego, May 1994, which is incorporated herein by reference. According to that article, use of a connection cookie in TCP/IP over an FDDI network of DEC Alphas resulted in a 31% latency improvement.

The problem might appear in a case when the first message is lost. Then the next message will be dropped as well, because the cookie is unknown and the Connection Identification is not included. The PA solves this problem by relying on retransmission by one of the protocol layers. Another solution is to agree on a cookie in advance before establishing a connection.

Finally, it is noted that the Gossip information does not necessarily need to be included in each message. Due to the fact that the Protocol Accelerator provides low latency for small messages, the gossip information is sent in separate messages. The PA automates separate transmission of gossip information, since it knows which information is gossip.

The full format of a PA message is illustrated in FIG. 1. It is important to note that in accordance with the present invention the headers collect fields of the same category, rather than fields of the same protocol layer.

2. Eliminating Layered Protocol Processing Overhead

In most protocol implementations, layered or not, a lot of processing is usually done between an application's send operation and the time that the message is actually sent out onto the network. The same is true for the processing between the arrival of a message and the delivery of that message to an application. In the PA the paths between the application and the network are called the send critical path and the delivery critical path. All other processing done by a protocol can be done in parallel with the application and is mostly of little concern.

The processing that is done on the critical path is complicated by layering. As a message passes through the layers, only the state of a current layer can be inspected and updated. Without layers the protocol implementor would be free to reorder protocol processing arbitrarily to reduce the length of the critical path. Furthermore, the processor's instruction cache is likely to be less effective if the critical path is divided over many software modules.

The PA uses three approaches to deal with the layering complication. First, the PA minimizes the critical path by delaying all updates of a protocol state until after the actual message is sent or delivered. Secondly, the PA predicts the protocol-specific header of the next message. Because of prediction, creation or check of the protocol-specific header is eliminated. Finally, the PA uses packet filters, in both send and delivery critical paths, to avoid passing through the layers of the protocol stack.

2.1 Canonical Protocol Processing

According to the present invention, send and delivery processings in a protocol layer can be done in two phases:

1. Pre-processing Phase-during this phase the message header is built (in the case of sending), or checked (in the case of delivery), but the protocol state is left unchanged. For example, a sequence number can be added to a message, or the sequence number in the message can be checked against the current one, without changing the state of the protocol.
2. Post-processing Phase—during this phase the protocol state is updated. For example, when sending or delivering, the sequence number maintained in the protocol state has to be incremented.

Such processing is called canonical protocol processing. The pre-processing of sending is called pre-sending, and pre-processing of delivery is called pre-delivery. The terms post-sending and post-delivery are used in a similar manner. It is always possible to convert a protocol to its canonical form. If necessary, the protocol state is checkpointed and restored to implement the pre-processing part, but typically a much less drastic and more efficient approach is taken. In a layered system, the pre-processing at every layer is done before the post-processing at any layer. Therefore, a message is sent onto the network or delivered to the application (in case the check succeeds) without changing the state of any protocol layer immediately. The update of protocol states (e.g., incrementing a sequence number or saving a message for retransmission) is done afterwards, out of the critical path, but before the next send or delivery operation.

2.2 Header Prediction

The protocol-specific information of a message can be predicted, that is, calculated before the message is sent or delivered, because this information does not depend on the message contents or the time the message is sent.

After the post-processing of a previous message has finished, the protocol-specific header of the next message is generated by pre-processing a dummy message. However, it is more convenient to have the post-processing phase of the previous message immediately predict the protocol header of the next message. This is an artifact of layers generating their own messages (acknowledgements, retransmissions, etc.). Such messages only update those fields in the predicted header that are maintained by that layer or the layers below.

Each connection maintains one predicted protocol-specific header for the next send operation, and another one for the next delivery operation (much like a read-ahead strategy in a file system). For sending, the Gossip information can be predicted as well, since it does not depend on the message contents.

At the time of sending, only the message-specific header has to be generated. That generation is done by means of a packet filter described in more detail below. The packet filter is also used to check the contents of the message to decide whether to use the predicted header or not.

During the delivery path, the contents of the protocol-specific header is quickly compared against the predicted header. Also, the message-specific information is checked using a packet filter in the delivery path. For delivery, the Gossip information is not important.

Each layer can disable the predicted send or delivery header (e.g., when the send window of a sliding window protocol is full). Each header has a counter associated with it. When the counter is set to zero, the header is enabled. By incrementing the counter, a layer disables the header. The layer eventually has to decrement the counter. When all layers have decremented their counters, the header is automatically re-enabled.

2.3 Packet Filters

Figure 2:
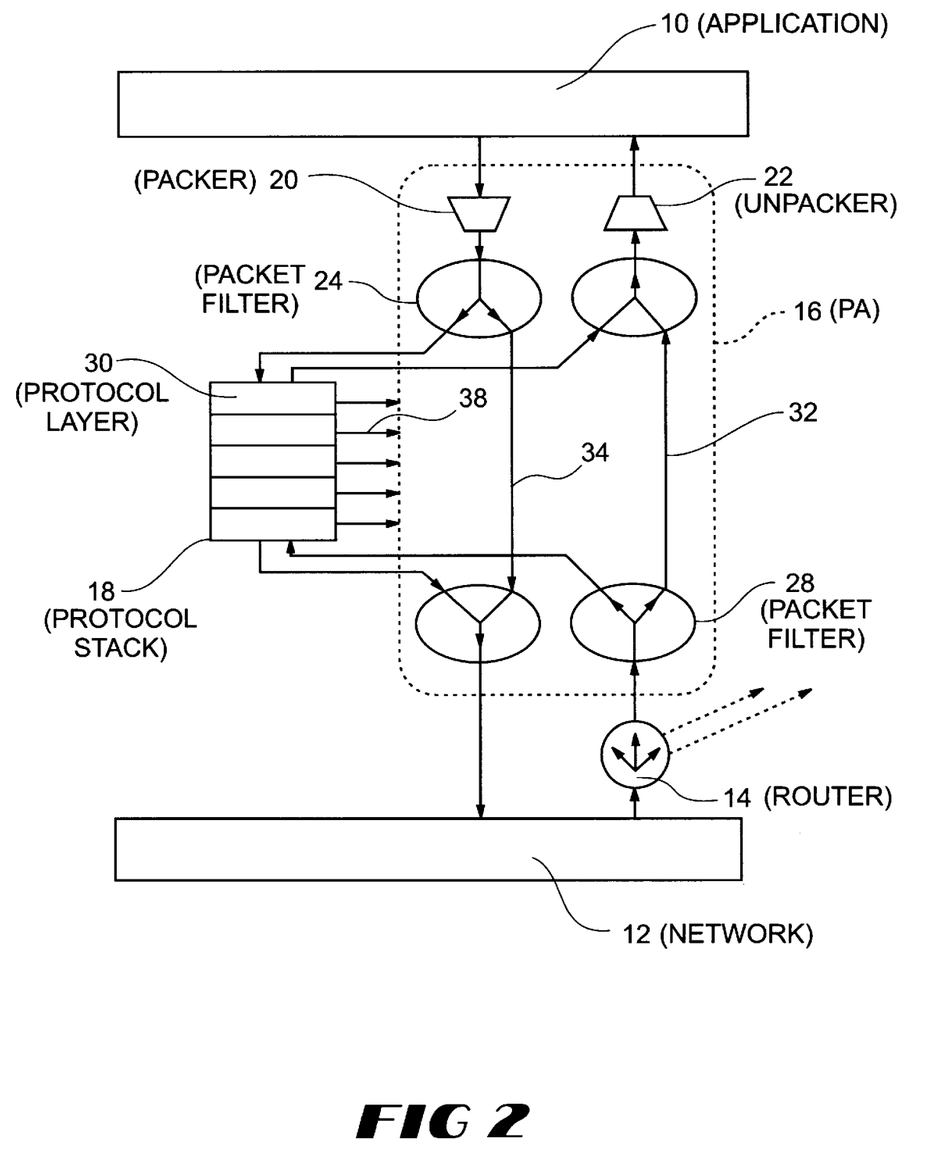
FIG. 2 is a system block diagram of the Protocol Accelerator according to the present invention.

The PA employs packet filters that can update headers in both delivery and send critical paths. Two packet filters 24 and 28 are shown in FIG. 2: the first packet filter 24 in the send path, the second packet filter 28 in the delivery path. In the delivery path packet filter 28 is used to check message-specific information for correctness instead of doing a pattern match of the header to decide to which module or connection the message should be forwarded.

When a message arrives from network 12, router 14 checks either a connection identifier or a connection cookie of the message. If router 14 determines that the connection cookie or the connection identifier corresponds to a different protocol stack, router 14 will pass the message to other protocol stacks and protocol accelerators (indicated by dashed arrows at router 14 in FIG. 2). If the connection cookie or the connection identifier of the message corresponds to protocol accelerator 16, router 14 passes the message to packet filter 28.

If protocol-specific information in the message header is as predicted by the protocol accelerator, packet filter 28 directs the message along a pre-delivery path 32, which bypasses protocol stack 18, to unpacker 22 and, subsequently, to application 10. If protocol-specific information in the message header is not as predicted, packet filter 28 passes the messages on to protocol stack 18. Similarly, along the send path packet filter 24 passes a message either directly to a pre-send path 34 or through protocol stack 18.

The packet filters 24 and 28 are stack machines. The operations of a packet filter are listed in Table 1. A packet filter program is a series of such operations that operate on a message header. The POP_FIELD operation is particularly important, since it takes the value of a stack and stores it in a given field of a header. There are no loop or function constructs, so a packet filter program can be checked in advance and the necessary size for the stack can be calculated (typically just a few entries). In a case when fields are conveniently aligned, packet filters 24 and 28 are optimized automatically using customized instructions. Packet filter programs are currently interpreted.

Packet filters 24 and 28 are constructed by protocol layers 30 of protocol stack 18. Each layer adds instructions to both send and delivery paths packet filters for the filters' particular message-specific fields. Packet filters 24 and 28 only need be programmed once (at the protocol stack initialization time). However, if message-specific information depends on the protocol state, part of the packet filter program is rewritten when the protocol state is updated at the post-processing phase.

Using packet filters for message-specific information and pre-processing of sending and delivery is usually avoided altogether. Only if the predicted header is disabled, or if a packet filter returns a non-zero value, or, in case of delivery, the cookie is unknown or the protocol-specific header does not match the predicted one, the pre-delivery phase of the protocol is executed.

TABLE 1

The operations of a packet filter.

| Operation | Argument | Action |
| --- | --- | --- |
| PUSH_CONSTANT | integer | push an integer onto the stack |
| PUSH_FIELD | field handle | push a field onto the stack |
| PUSH_SIZE | | push the size of the message |
| Digest | function ptr | push a message digest |
| POP_FIELD | field handle | pop top of stack into a field |
| ADD, SUB, . . . | | do operation on top two entries |
| EQ, NE, LT, . . . | | comparison of top two entries |
| RETURN | integer | return the given value |
| ABORT | integer | return value if top entry non-zero |

2.4 Message Packing

The PA significantly reduces the latency of individual messages by employing a packer as shown in FIG. 2, provided that the messages are spaced out far enough to allow time for post-processing. If not, messages will have to wait until completion on the post-processing phase of every previous message. To reduce this kind of overhead, the PA uses message packing in order to deal with backlogs. The message packing technique is described in the article by Roy Friedman and Robert van Renesee, Packing Messages as a Tool for Boosting the Performance of Total Ordering Protocols. Technical Report 94-1527, Cornell University, Dept. of Computer Science, July 1995. Submitted to IEEE Transactions on Networking, that is incorporated herein by reference.

After the post-processing phase of a send operation is completed, the PA checks to see if there are messages waiting. If there are more than one, the packer of the PA will pack these messages together into a single message. The single message is then processed in the usual way, which takes only one pre-processing phase and one post-processing phase. When the packed message is ready for delivery, it is unpacked by the unpacker of the PA and the messages are individually delivered to the application. The packer 20 and the unpacker 22 of the PA are shown in FIG. 2.

The PA, therefore, uses a sixth header to describe how the messages are packed, the sixth being called the Packing Information header as. illustrated in FIG. 1. The Packing Information header contains information about the size of each of the messages. According to another embodiment of the PA, a more sophisticated header, such as used in the original Horus system, is used to pack any list of messages, if applications so demand. Special care is required in the case when messages are prioritized.

The PA also buffers messages in the case when the predicted send header is disabled. That disabling occurs, for example, when the send window of a sliding window protocol is full. Again, buffering leads to a backlog which is effectively dealt with using the packing mechanism.

TABLE 2

Table of information maintained by the Protocol Accelerator for send and delivery operations.

| Field | Type | Purpose |
| --- | --- | --- |
| mode | IDLE, PRE, or POST | state of operation |
| predict_msg | header | all six headers |
| disable | integer | predicted header disabled |
| pre_msg | message | message to post-process |
| packet_filter | packet filter | packet filter to apply |
| backlog | list of messages | waiting for processing |

3. Implementation of the Protocol Accelerator.

The architecture of the PA is shown in FIG. 2. The application 10, network driver 12, router 14 (which delivers messages to the correct PA), and PA 16 are all written in C. The protocol stack 18 may be written in any language, but is currently written in ML. Horus has a PA for each connection. Each PA 16 maintains the layout descriptors for each of the headers, as well as a table of information for both sending and delivery, as shown in Table 2.

Figure 3:
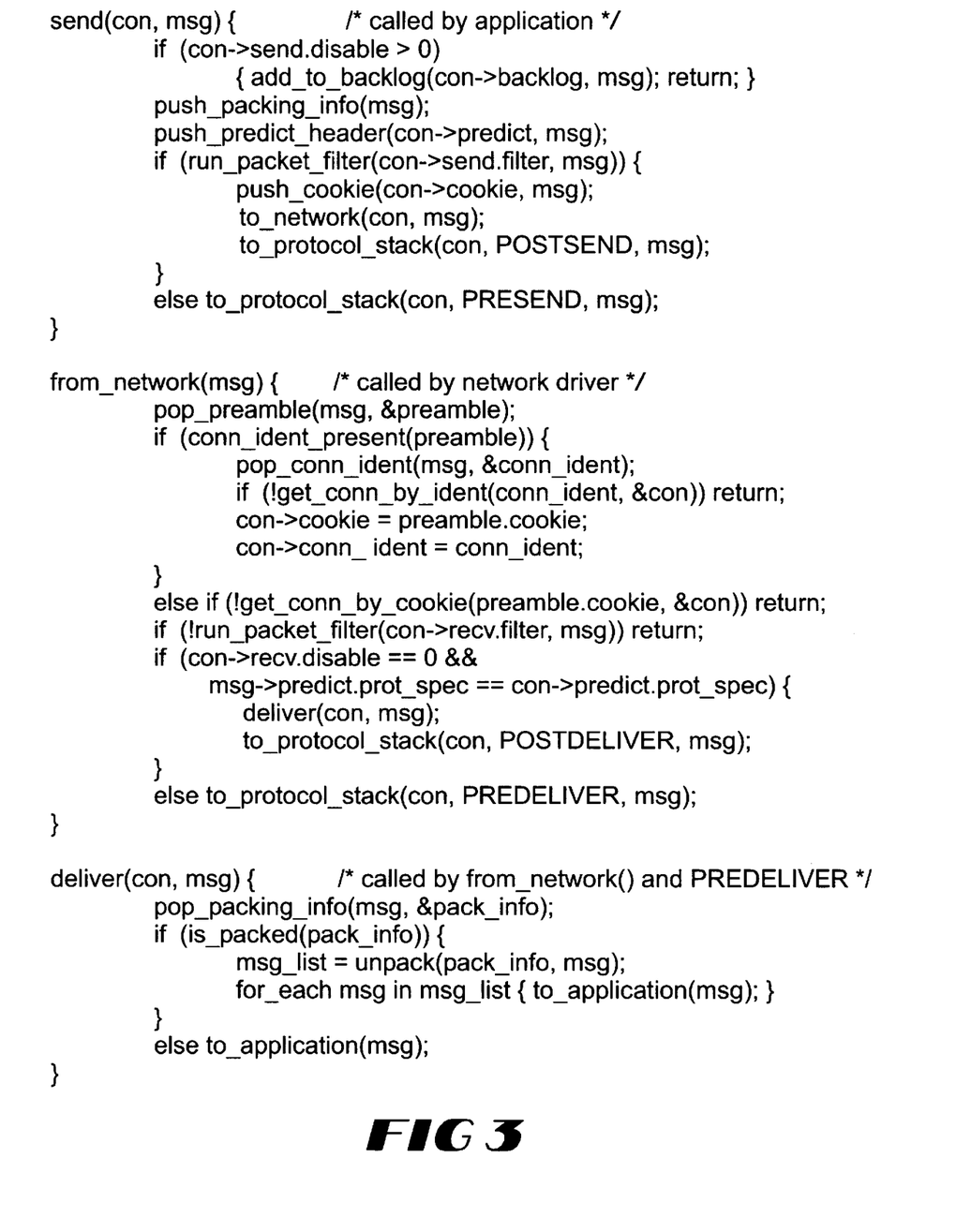
FIG. 3 is a chart illustrating the code of the Protocol Accelerator according to the present invention.

A condensed implementation of PA 16 is illustrated in FIG. 3. The real implementation of the PA, including the code for the packet filter and the message management code, is about 1500 lines in C. When application 10 invokes send (), packer 20 of the PA first checks to see if the disable counter is zero. If the counter is not zero, packer 20 adds the message to the backlog and later passes all the backlogged messages as a whole message to send packet filter 24.

If the counter is zero, packing information and a predicted header are added to the message, then send packet filter 24 is activated. Send packet filter 24 fills out the message-specific and gossip information, then sends the message into network 12 along the pre-send path by-passing protocol stack 18. Filter 24 can be programmed to fail, for example, if a message is too large to be sent unfragmented. If the message is not too large, the connection cookie is pushed onto the message and the message is sent via the pre-send path. After being sent the message is passed onto protocol stack 18 for post-processing. Upon completion of the post-processing phase, the backlog of messages is inspected.

If protocol-specific information is not as predicted, or the above described method can not be followed, a message is passed onto protocol stack 18 for pre-processing. Pre-processing usually results in actual sending of a message, but any layer of protocol stack 18 can halt sending by buffering the message until later. Every layer of protocol stack 18 has access to the PA 16 (arrows 38 in FIG. 2) and is incapable of reprogramming PA 16 at post-send and post-delivery phases. When the pre-processing phase is completed, the message is sent out onto network 12 and is again passed to the stack for post-processing. During the post-processing phase the predicted header for the next message is updated.

When a message arrives from the network, the conn__ident__present bit is inspected by router 14. If the bit is set, the connection identification information is used to find the connection. If no connection is found, the message is dropped. If connection is found, the connection cookie is stored. If a connection cookie or connection identification in a message header points to a different protocol stack, then router 14 passes the message onto other protocol accelerators or protocol stacks (dashed arrows in router 14). If the connection identification is not present in the message, the cookie in the header is used to locate the connection. Next, deliver packet filter 28 is run to see if the message-specific information is acceptable. If so, and if the disable counter is zero and the protocol-specific information is the same as the predicted information, the deliver () routine along the pre-deliver path is invoked.

The post-processing of sending and delivery operations, as well as garbage collection, is carefully scheduled by the PA to minimize the round-trip latency. Since post-processing and garbage collection actually take longer than the U-Net round-trip time, post-processing and garbage collection are scheduled to occur after message deliveries. On slower networks, such as Ethernet, post-processing and garbage collection can be done between round-trips as well.

4. Performance of the Protocol Accelerator 4.1 Test Results

The PA was tested on two Sun SparcStation 20s, each running SunOS 4.1.3. The workstations were connected by a Fore 140 mbit/sec ATM network. The firmware and driver used for testing were not by Fore; instead the U-Net software was used. Unless noted otherwise, all the tests other than bandwidth measurements used messages containing 8 bytes of user data. In such a configuration the raw U-Net one-way latency is about 35 $\mu$secs. U-Net provides unreliable communication, but no message loss was detected during the tests. The protocol stack used in the tests implemented a basic sliding window protocol with a window size of 16 entries, written in CAML Special Light as described in an article by Xavier Leroy, *The Caml Special Light System Release* 1.10, INRIA, France, November 1995, which is incorporated herein by reference. For predictable results without hiccups, garbage collection was triggered upon message receipt, unless noted otherwise. Basic performance results of the Protocol Accelerator are listed in Table 3.

TABLE 3

Basic performance of the Protocol Accelerator.

| What | Performance |
|---|---|
| one-way latency | 85/$\mu$secs |
| message throughput | 80,000 msgs/sec |
| #roundtrips/sec | 6000 rt/sec |
| bandwidth (1 Kbyte msgs) | 15 Mbytes/sec |

Figure 4:
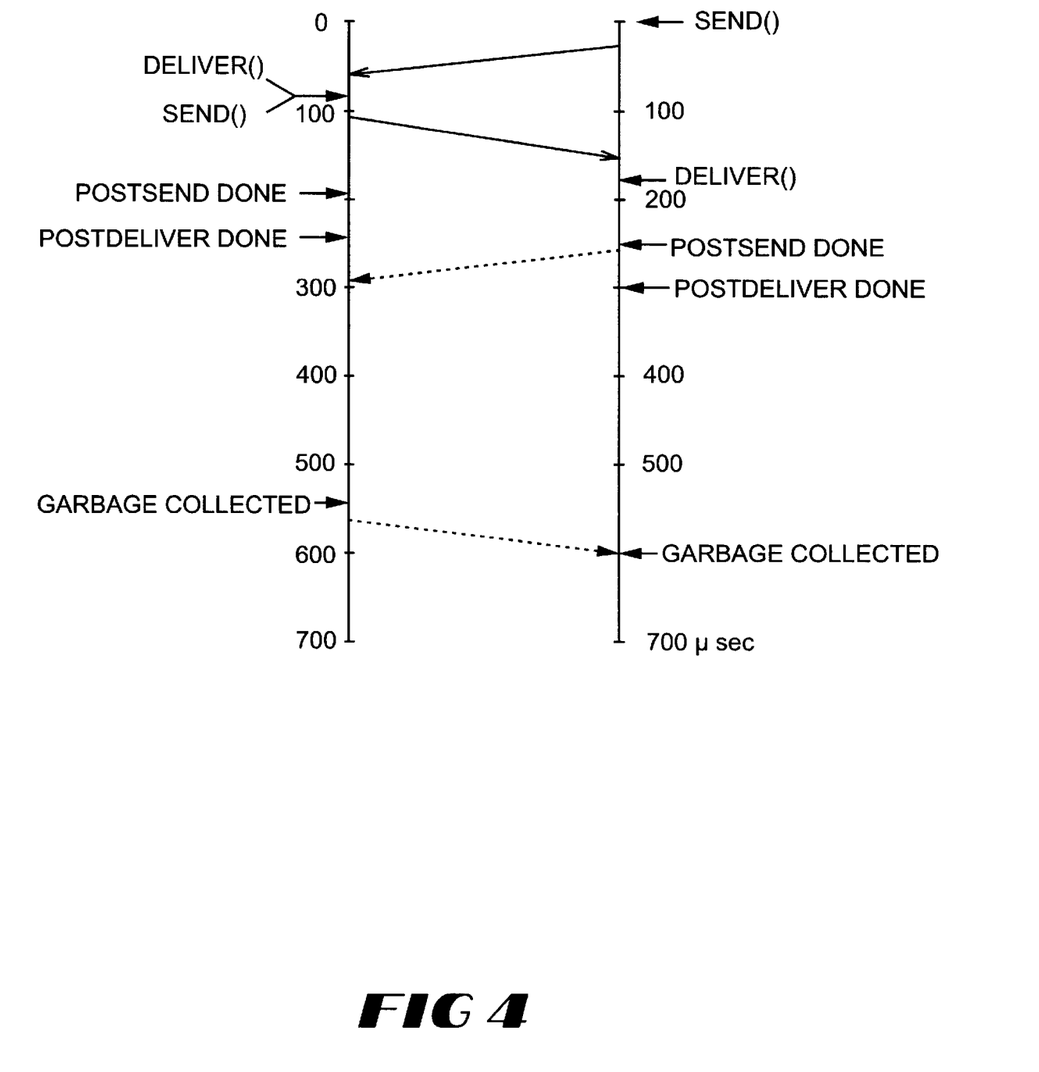
FIG. 4 is a chart illustrating round-trip computation and communication performance provided by the Protocol Accelerator according to the present invention.

FIG. 4 shows the breakdown of computation and communication costs of the round-trip execution. The first round-trip is the typical case. The dashed roundtrip line depicts the round-trip performance if the system is pushed to its limits, and results in a high latency. The sender (on the right) first spent about 25 $\mu$secs before handing a message to U-Net. The message was received 35 $\mu$secs later. It was delivered in another 25 $\mu$secs. The receiver immediately sent a reply message. It took the same amount of time to deliver the reply message. Total round-trip time was therefore about 170 $\mu$secs. After delivery of a message, the PA did the post-processing of both send and deliver operations and garbage collection. The time for post-processing and garbage collection depends on the structure of layers in the protocol stack.

Figure 5:
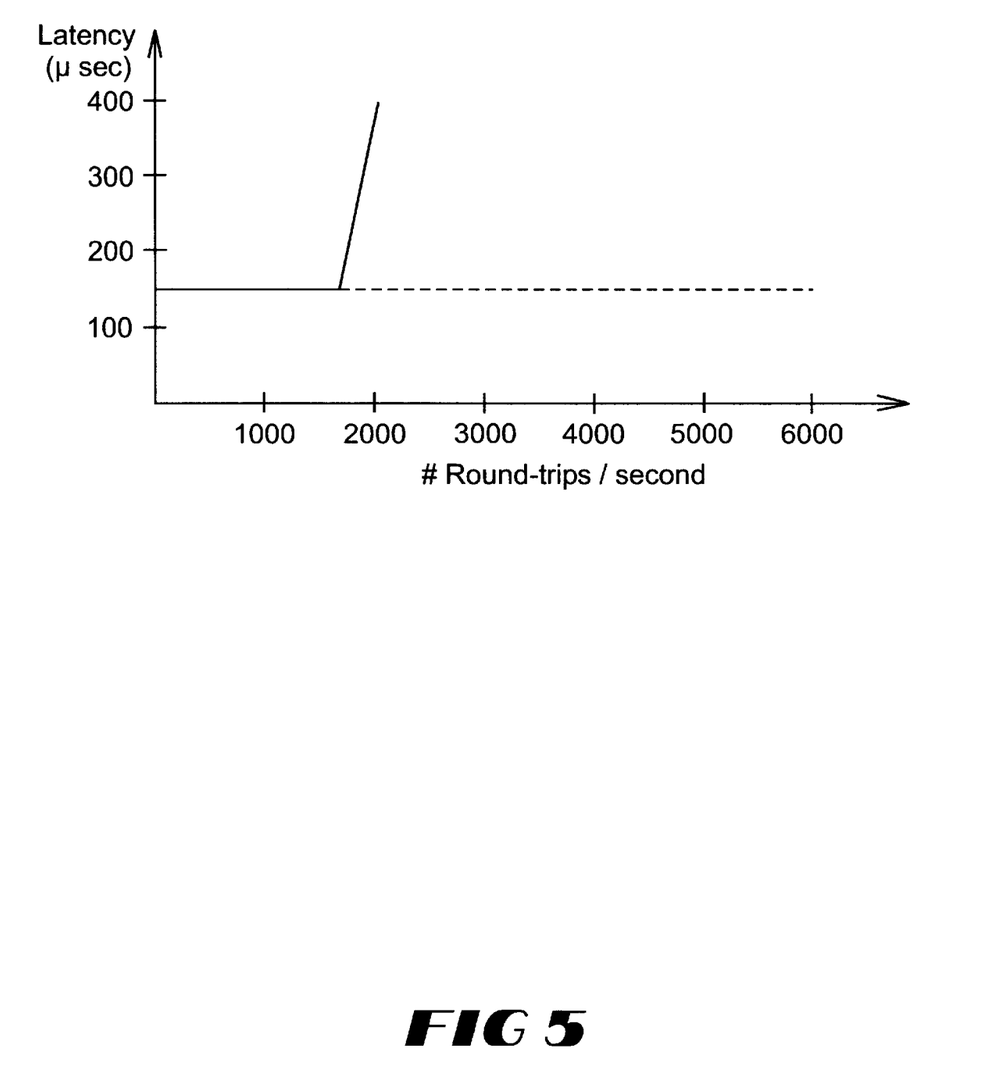
FIG. 5 is a graph of round-trip latency as a function of the number of round-trips per record in the Protocol Accelerator according to the present invention.

In the case corresponding to FIG. 4, four layers were stacked together to implement a basic sliding window protocol. The post-processing of sending took about 80 $\mu$secs, while the post-processing of delivery took 50 $\mu$secs. Garbage collection took between 150 and 450 $\mu$secs, with an average of about 300 $\mu$secs, as shown in FIG. 4. Dashed lines in FIG. 4 illustrate the earliest next possible round-trip. Because of the post-processing and garbage collection overheads, the maximum number of round-trips per second over such a protocol stack is about 1900, with an average round-trip latency of about 400 $\mu$seconds (in the worst case, about 550 $\mu$seconds). As illustrated in FIG. 5, only if fewer than 1650 roundtrips per second are done, can a round-trip latency of 170 $\mu$secs be maintained.

To see how each layer adds to the overhead, the performance of a stack with two layers that actually implemented the sliding window also was tested and measured. Each such layer was implemented in about 200 lines of ML code. The post-processing of the send and delivery operations took about 15 $\mu$secs each. No additional overhead for garbage collection was found.

It was not necessary to garbage collect after every round-trip. By not garbage collecting every time, the number of round-trips per second increased up to about 6000. In the present Protocol Accelerator, such a number is the maximum that can be achieved, because all post-processing was done between the actual sending and delivery of the messages.

Round-trip latency as a function of the number of round-trips per second is shown in FIG. 5. The solid line corresponds to the case when each round-trip is followed by a garbage collection phase. The dashed line corresponds to the case when garbage collection is done only occasionally, which results in improved performance, but leads to occasional hiccups.

4.2 Fragmentation/Reassembly

Most networks only accept messages up to a certain maximum size, so that fair access to the medium can be guaranteed. Also, with any bit error rate, the chances of a large message getting through undamaged are smaller than those for a small message. For these reasons, large application messages have to be split into fragments before being sent. The fragments are assembled at the peer side before delivery.

In accordance with the present invention, pre-processing of large messages needs to be handled by the protocol stack. The fragmentation/reassembly layer adds code to the send packet filter to reject messages over a certain size to accomplish preprocessing of a large message. By using a protocol-specific bit that is non-zero if and only if the message is a fragment of a larger message, the sending packet filter makes sure that the receiving PA does not "predict" the header, so that the fragment is passed to the protocol stack for reassembly.

When low latency is a consideration only for small messages, fragmentation is not a problem. If fragmentation becomes a problem, the packing/unpacking mechanism of the PA can be extended with fragmentation/reassembly functionality.

4.3 Application to Standard Protocols

The PA may be applied to standard protocol implementations, such as TCP/IP, to improve latency, provided that a peer on another host also implements the PA.

Even if a peer does not implement the PA, the preprocessing and post-processing techniques of the present invention are still applicable. Messages will be larger and comparison of the protocol-specific information to the predicted information will be more expensive.

4.4 Maximum Load

The maximum number of Remote Procedure Calls (RPC) that an individual client may do is limited to 6000 per second, as described in Section 4.1. Even with multiple clients, a server that uses a PA for each client cannot process more than a total of 6000 requests per second, because the post-processing phase will consume all the server's available CPU cycles. For more complex stacks, this maximum of 6000 requests per second is reduced even further.

This limit may be improved in at least three ways. With the current PA, the maximum number of round-trips per client is about 6000 roundtrips per second per connection (1/.000170), but it is possible to use less CPU time to accommodate more clients. First, a different language or a faster implementation of ML (e.g., C or Modula-3) must be chosen. Secondly, since modern servers are likely to be multi-processed, protocol stacks for different connections may be divided among the processors. Since the protocol stacks are independent, no synchronization is necessary. Therefore, in a multi-processed server the maximum number of 6000 RPCs per second is multiplied by the number of processors.

Finally, a server can be replicated. In this case, synchronization of the server's processing and data may be required. Such synchronization may lead to additional complex protocols. However, the method and structure of the present Protocol Accelerator are specifically designed to reduce system complexity caused by introduction of additional protocols. Distribution introduces complexity, but it allows for higher client loads. Complexity is managed by layering and using high-level languages, while the overhead caused by usage of layering and high-level languages is masked by the PA.

What is claimed is:

1. A system for reducing communication latency in a digital network, the system comprising:
    a first path along which a first frame is sent to the digital network, the first frame having a header including an immutable part and a variable predictable part;
    a second path along which a second frame is delivered to an application layer from the digital network, the second frame having a header including an immutable part and a variable predictable part;
    a first filter capable of comparing the predictable part of the header of the first frame to a predetermined value and then sending the first frame to a predetermined destination, the first filter being situated along the first path;
    a frame packer capable of packing the first frame from smaller frames received from the application layer, the frame packer being situated along the first path before the first filter;
    a second filter capable of comparing the predictable part of the header of the second frame to a predetermined value and then sending the second frame to a predetermined destination, the second filter being situated along the second path; and
    a frame unpacker capable of unpacking the second frame into smaller frames, the frame unpacker being situated along the second path before the application layer.

2. The system of claim 1 further comprising a router for making a determination of how to route the frame by checking the information contained in the immutable part of the header and for routing the frame in accordance with the determination.

3. The system of claim 1, wherein the header is divided into four categories.

4. The system of claim 1 further comprising a plurality of protocol layers, wherein each layer is capable of sending instructions to the first filter.

5. The system of claim 4, wherein the predetermined destination comprises the plurality of protocol layers.

6. The system of claim 1, wherein the first path includes the plurality of protocol layers.

7. The system of claim 1, wherein the second path includes the plurality of protocol layers.

8. The system of claim 1, wherein the predetermined destination comprises the frame unpacker.

9. A system for reducing communication latency in a digital network, the system comprising:
    a path between the digital network and an application layer along which a frame is passed from the digital network to the application layer, the frame having a header with an immutable part and a variable predictable part;
    a filter capable of sending the frame to a predetermined destination after comparing the predictable part of the header to a predetermined value; and
    an unpacker capable of unpacking the frame into smaller frames, the unpacker being located along the path between the filter and the application layer.

10. The system of claim 9 further comprising a router situated along the path between the digital network and the filter, wherein the router is capable of making a determination of how to route the frame by checking the information contained in the immutable part of the header and routing the frame in accordance with the determination.

11. The system of claim 9, wherein the header is divided into four categories.

12. The system of claim 9 further comprising a plurality of protocol layers, wherein each layer sends instructions to the filter.

13. The system of claim 9, wherein the path includes the plurality of protocol layers.

14. The system of claim 13, wherein the predetermined destination comprises the plurality of protocol layers.

15. The system of claim 9, wherein the predetermined destination comprises the unpacker.

16. A system for reducing communication latency in a digital network, the system comprising:
    a path between the digital network and an application layer along which a frame is passed from the application layer to the digital network, the frame having a header with an immutable part and a variable predictable part;
    a filter capable of sending the frame to a predetermined destination after comparing the predictable part of the header to a predetermined value; and
    a packer capable of making the frame from smaller frames, the packer being located along the path between the filter and the application layer.

17. The system of claim 16, wherein the header is divided into four categories.

18. The system of claim 16 further comprising a plurality of protocol layers, wherein each layer sends instructions to the filter.

19. The system of claim 16, wherein the path includes the plurality of protocol layers.

20. The system of claim 19, wherein the predetermined destination comprises the plurality of protocol layers.

21. The system of claim 16, wherein the predetermined destination comprises the digital network.

* * * * *

UNITED STATES PATENT AND TRADEMARK OFFICE
CERTIFICATE OF CORRECTION

PATENT NO. : 6,208,651 B1
DATED : March 27, 2001
INVENTOR(S) : Van Renesse et al.

It is certified that error appears in the above-identified patent and that said Letters Patent is hereby corrected as shown below:

Column 1,
Before "BACKGROUND OF THE INVENTION", insert the following paragraph:
-- This invention was made with Government support from the ONR/ARPA under Contract No. N00014-92-J-1866. The Government has certain rights in the invention. --

Column 3,
Line 58, "in" should be -- is --.

Column 9,
Line 50, "Robert van Renesee" should be -- Robbert Van Renesse --.

Signed and Sealed this

Sixth Day of November, 2001

Attest:

NICHOLAS P. GODICI
Attesting Officer   Acting Director of the United States Patent and Trademark Office